(12) United States Patent
Hsu

(10) Patent No.: US 9,210,631 B2
(45) Date of Patent: Dec. 8, 2015

(54) APPARATUS AND METHOD OF BANDWIDTH AGGREGATION FOR RADIO ACCESSING ON MULTI-NETWORKS

(71) Applicant: INDUSTRIAL TECHNOLOGY RESEARCH INSTITUTE, Hsinchu (TW)

(72) Inventor: Yu-Ching Hsu, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 96 days.

(21) Appl. No.: 13/853,844

(22) Filed: Mar. 29, 2013

(65) Prior Publication Data

US 2014/0177507 A1 Jun. 26, 2014

(30) Foreign Application Priority Data

Dec. 26, 2012 (TW) .............................. 101150181 A

(51) Int. Cl.
*H04W 4/00* (2009.01)
*H04W 36/14* (2009.01)
*H04L 5/00* (2006.01)
*H04W 76/02* (2009.01)
(Continued)

(52) U.S. Cl.
CPC ................ *H04W 36/14* (2013.01); *H04L 5/00* (2013.01); *H04W 76/025* (2013.01); *H04W 88/06* (2013.01); *H04W 88/10* (2013.01)

(58) Field of Classification Search
CPC ... H04W 36/14; H04W 76/025; H04W 88/06; H04W 88/10; H04L 5/00
See application file for complete search history.

(56) References Cited

U.S. PATENT DOCUMENTS 6,904,029 B2   6/2005   Fors et al.
6,931,249 B2   8/2005   Fors et al.
(Continued)

FOREIGN PATENT DOCUMENTS

EP   2262319 A1   12/2010
TW   201225716 A   6/2012
(Continued)

OTHER PUBLICATIONS

Tervonen: "Deliverable DA2.2.22 Offloading Traffic from Cellular Networks with PBRM", Internet Citation, Jun. 30, 2010, pp. 1-39, XP007919591,Retrived from the Internet: URL:www.futureinternet. Fi/ publications/ ICT_SHOK_FIPhase2_DA2.2.22_10-1.pdf [retrieved on Oct. 19, 2011] * p. 10, paragraph 2.3-p. 22,paragraph 4.1.2* * pate 25, paragraph 5-p. 36, paragraph 5.4*.
(Continued)

*Primary Examiner* — Clemence Han
(74) *Attorney, Agent, or Firm* — Rabin & Berdo, PC

(57) ABSTRACT

According to one exemplary embodiment of a method of bandwidth aggregation for radio accessing on multi-networks, a UE on a first network and a network device supporting the first network and a second network exchange or set one second network information of each other. At least one first network dedicated channel is established between the UE and the network device. According to the information of the at least one first network dedicated channel, the UE and the network device may use the first and the second networks to transmit at least one packet belonging to the at least one first network dedicated channel.

54 Claims, 17 Drawing Sheets

| | |
|---|---|
| 1st scheme | HeNB+ sets the SSID of the WiFi AP to the global cell identifier (Global cell ID) or the Closed Subscriber Group (CSG) ID |
| 2nd scheme | HeNB+ adds the WiFi configuration information, such as SSID, in the SIB and broadcasts the updated SIB |
| 3rd scheme | HeNB+ adds the WiFi configuration information, such as SSID, in existing information element, such as Measurement Configuration or Radio Resource Configuration, of dedicated RRC message, which will be sent to the UE |
| 4th scheme | MME adds the WiFi configuration information, such as SSID, in defined NAS message |

(51) Int. Cl.
H04W 88/06 (2009.01)
H04W 88/10 (2009.01)

(56) References Cited

U.S. PATENT DOCUMENTS

| | | | |
|---|---|---|---|
| 7,046,998 | B2 | 5/2006 | Verma et al. |
| 7,146,186 | B1 | 12/2006 | Moon et al. |
| 8,023,469 | B2 | 9/2011 | Sachs et al. |
| 2006/0200543 | A1 | 9/2006 | Kong et al. |
| 2007/0082697 | A1 | 4/2007 | Bumiller et al. |
| 2010/0085948 | A1* | 4/2010 | Yu et al. ............... 370/338 |
| 2011/0171953 | A1 | 7/2011 | Faccin et al. |
| 2011/0191465 | A1* | 8/2011 | Hofstaedter et al. ......... 709/224 |
| 2011/0213827 | A1* | 9/2011 | Kaspar et al. ............... 709/203 |
| 2011/0292914 | A1 | 12/2011 | Sachs et al. |
| 2013/0237226 | A1* | 9/2013 | Periyalwar et al. ......... 455/436 |
| 2014/0003449 | A1* | 1/2014 | Li ............................ 370/468 |
| 2014/0161002 | A1* | 6/2014 | Gauvreau et al. ............ 370/280 |

FOREIGN PATENT DOCUMENTS

| | | |
|---|---|---|
| TW | 201251359 A | 12/2012 |
| WO | WO-2011069096 A2 | 6/2011 |
| WO | WO 201212175 A1 * | 9/2012 |
| WO | WO-2012121757 A1 | 9/2012 |

OTHER PUBLICATIONS

Tomici et al:"Multi-RAT traffic offloading solutions for the bandwidth crunch problem", Systems, Applications and Technology Conference (LISAT), 2011 IEEE Long Island, IEEE, May 6, 2011, pp. 1-6, XP031880722, DOI: 10.1109/LISAT.2011.5784243 ISBN: 978-1-4244-9878-9 * the whole documet *.

"3rd Generation Partnership Project; Technical Specification Group Radio Access Network; Strdy on WLAN/3GPP Radio Access Network; Study on WLAN/3GPP Radio Interworking(Release 12)", 3GPP Standard; 3GPP TR 37.834, 3rd Generation Partnership Progect (3gPP), Mobile Competence Centre; 650, Route EDS Lucioles; F-06921 Sophia-Antipolis Cedex; France, vol. RAN WG2, No. VO.3.0, Jun. 24, 2013,pp. 1-14, XP050692777,[retrieved on Jun. 24, 2013] * the whole document *.

ITRI: "A Feasibility Analysis of Netword Selection/Traffic Steering by RAM", 3GPP DRAJT; R2-132355, 3rd Generation Partnership Project (3gPP), Mobile Competence Center ; 650, Route Des Lucioles ; F-06921 Spthia-Atipolis Cedex; France, vol. RAN WG2, no. Barcelona, Spain; 20130819-20130823 Aug. 9, 2013, XP050718128, Retrived from the Internet: URL:http://www.3gpp.org/ftp/tsg_ran/WG2_RL2/TSGR2_83/Docs/[retriered on Aug. 9, 2013] * the whole document *.

ITRI: "Discussion on Inter-node Radio Resource Aggregation", 3Gpp Draft; R2-134016, 3rd Generation Partnership Project (3GPP), Mobile Competence Centre ; 650, Route Des Lucioles ; F-06921 Sophia-Antipolis Cedex; France, vol. RAN WG2, no. San Francisco, UAS; 20131111-20131115 Nov. 13, 2013, XP050736824, Retrieved from the Internet: URL:http://www.3gpp.org/ftp/Meetings_3GPP_SYNC/RAN/RAN2/Docs/ [retrieved on Nov. 13, 2013] * the whole document *.

"3rd Generation Partnership Project; Technical Specification Group Radio Access Netwouk; Study on Wireless Local Area Network (WLAN)—3Gpp radio interworking (Release 12)", 3GPP Standark; 3GPP TR 37.834, 3rd Generation Partnership Project (3GPP), Mobile Competence Center ; 650, Route Des Lucioles ; F-06921 Sophia-Antipolis Cedex; France, vol. RAN WG2, No. V12.0.0, Jan. 7, 2014, pp. 1-17, XP050729404, [retrived on Jan. 7, 2014] * the whole document *.

European Patent Office, Search Report with Written Opinion, Patent Application Serial No. EP13 17 6093, Date of completion of the search: May 8, 2014, European Patent Office.

Evensen et al., "A Network-Layer Proxy for Bandwidth Aggregation and Reduction of IP Packet Reordering", 2009 IEEE 34th Conference on Local Computer Networks (LCN 2009) Zürich, Switzerland; 20-23 ,p. 585-p. 592, Oct. 2009.

Fernandez et al., "Bandwidth Aggregation-Aware Dynamic QoS Negotiation for Real-Time Video Streaming in Next-Generation Wireless Networks", IEEE Transactions on Multimedia, vol. 11, No. 6, p. 1082-p. 1093, Oct. 2009.

Chai et al., "Sidekick: AP Aggregation Over Partially Overlapping Channels", 2011 19th IEEE International Conference on Network Protocols, p. 301-p. 310, 2011.

Kim et al., "PRISM: Improving the Performance of Inverse-Multiplexed TCP in Wireless Networks", IEEE Transactions on Mobile Computing, vol. 6, No. 12, p. 1297-p. 1312, Dec. 2007.

Robinson et al., "A Practical Model for Transmission Delay of IEEE 802.11E Enhanced Distributed Channel Access", IEEE PIMRC, p. 323-p. 328, 2004.

Nakase et al., "Improvement of Bit Error Rate Using Channel Interleaving for Channel Binding WLAN Prototype", IEEE PIMRC, p. 1-p. 5, 2008.

Ong et al., "IEEE 802.11ac: Enhancements for Very High Throughput WLANs", 2011 IEEE 22nd International Symposium on Personal, Indoor and Mobile Radio Communication, p. 849-p. 853, 2011.

Nekovee et al., "Can Cognitive Radio Access to TV White Spaces Support Future Home Networks?", IEEE Communications Society subject matter experts for publication in the IEEE DySPAN 2010 proceedings, p. 1-p. 8, 2010.

Nekovee et al., "Wireless options for high data-rate indoor users: cognitive access to TV white space", IEEE UKIWCWS 2009, p. 1-p. 6, 2009.

Bazzi et al., "WLAN hot spots to increase UMTS capacity", 21st Annual IEEE International symposium on Personal, Indoor and Mobile Radio communications, IEEE PIMRC, p. 2488-p. 2493, 2010.

Karetsos et al., "A Hierarchical Radio Resource Management Framework for Integrating WLANS in Cellular Networking Environments", IEEE Wireless Communications, p. 11-p. 17, 2005.

Chan et al., "A Utility-Based Network Selection Scheme for Multiple Services in Heterogeneous Networks", 2005 International Conference on Wireless Networks, Communications and Mobile Computing, p. 1175-p. 1180, 2005.

Modeas et al., "An Algorithm for Radio Resources Management in Integrated Cellular/WLAN Networks", The 18th Annual IEEE International Symposium on Personal, Indoor and Mobile Radio Communications (PIMRC'07), IEEE PIMRC, 2007, p. 1-p. 5, 2007.

Taiwan Patent Office, Office Action, Patent Application Serial No. TW101150181, Mar. 2, 2015, Taiwan.

* cited by examiner

| | |
|---|---|
| 1st scheme | HeNB+ sets the SSID of the WiFi AP to the global cell identifier (Global cell ID) or the Closed Subscriber Group (CSG) ID |
| 2nd scheme | HeNB+ adds the WiFi configuration information, such as SSID, in the SIB and broadcasts the updated SIB |
| 3rd scheme | HeNB+ adds the WiFi configuration information, such as SSID, in existing information element, such as Measurement Configuration or Radio Resource Configuration, of dedicated RRC message, which will be sent to the UE |
| 4th scheme | MME adds the WiFi configuration information, such as SSID, in defined NAS message |

FIG. 5

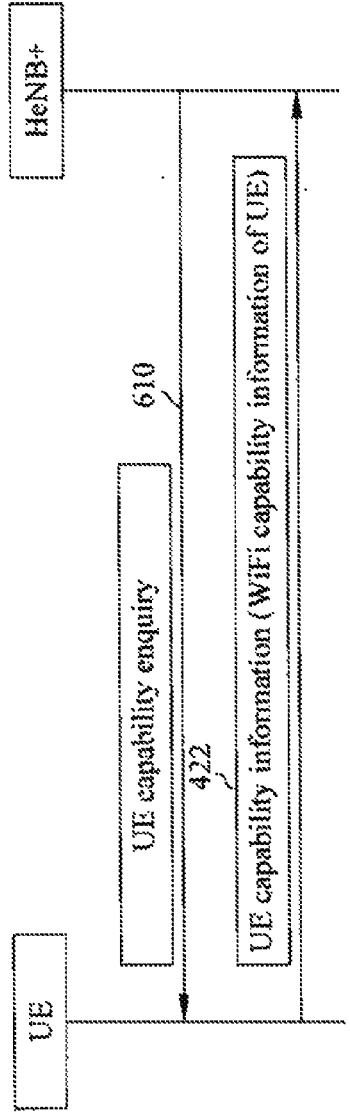
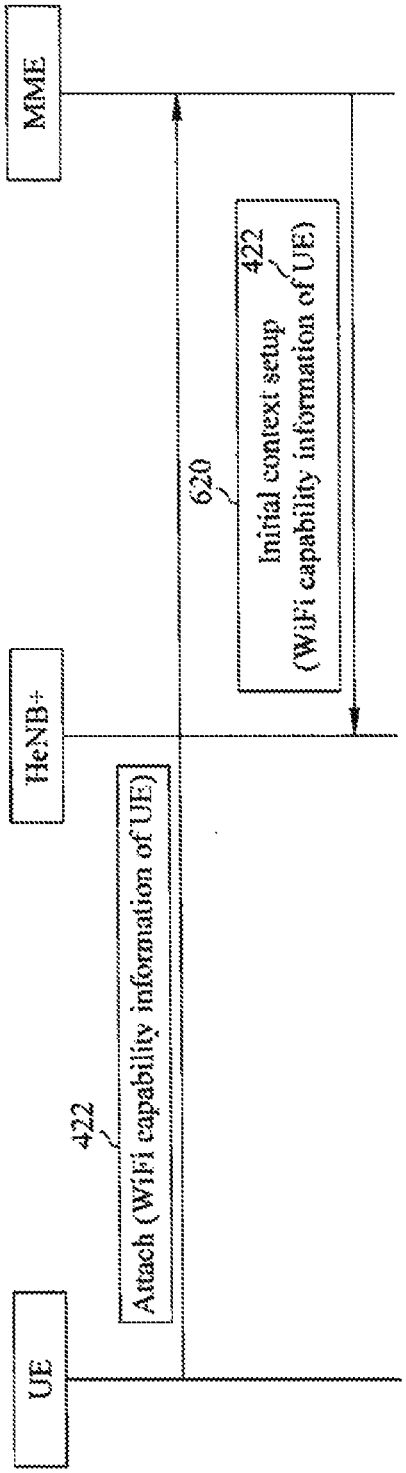
FIG. 6A
FIG. 6B

| To Destination (TO DS) | From Destination (From DS) | address 1 | address 2 | address 3 | address 4 |
|---|---|---|---|---|---|
| 0 | 0 | DA | SA | BSSID | N/A |
| 0 | 1 | DA | BSSID | SA | N/A |
| 1 | 0 | BSSID | SA | DA | N/A |
| 1 | 1 | RA | TA | DA | SA |

| IP Layer | WiFi MAC Layer | WiFi Physical Layer |
|---|---|---|
| Packet Data Congestion Protocol Layer | WiFi MAC Layer | WiFi Physical Layer |
| RLC Layer | | |
| MAC Layer | | |
| Physical Layer | | |

FIG. 12C

| IP Layer | WiFi MAC Layer | WiFi Physical Layer |
|---|---|---|
| Packet Data Congestion Protocol Layer | WiFi MAC Layer | WiFi Physical Layer |
| RLC Layer | | |
| MAC Layer | | |
| Physical Layer | | |

| Controller Application Module | IP Layer | | |
|---|---|---|---|
| | | WiFi Media Access Control Layer | WiFi Physical Layer |
| | GTP-U Plane | | |
| Packet Data Congestion Protocol Layer | IP Layer | | |
| Radio Link Control Layer | Media Access Control Layer | | |
| Media Access Control Layer | Physical Layer | | |
| Physical Layer | | | |

APPARATUS AND METHOD OF BANDWIDTH AGGREGATION FOR RADIO ACCESSING ON MULTI-NETWORKS

CROSS-REFERENCE TO RELATED APPLICATION

The present application is based on, and claims priority from, Taiwan Patent Application No. 101150181, filed Dec. 26, 2012, the disclosure of which is hereby incorporated by reference herein in its entirety.

BACKGROUND

1. Technical Field

The present disclosure relates generally to an apparatus and method of bandwidth aggregation for radio accessing on multi-networks.

2. Related Art

The routing mechanism of wireless networks having a connection management, such as the 3rd Generation Partnership Project (3GPP) or the Worldwide Interoperability for Microwave Access (WiMAX) network, and wireless networks not having a connection management, such as the Wireless Fidelity (WiFi), are different. When the user equipment (UE) desires to connect with a wireless network having a connection management, the UE first establishes a connection, and the UE is configured with a dedicated bandwidth. Also, its radio access is achieved by the non-contention-based Media Access Control (MAC) technology. When the UE desires to connect with the wireless network not having a connection management, the UE does not need to be configured with the dedicated bandwidth once connects to network, and its radio access is achieved by the contention-based MAC technology. FIG. 1 and FIG. 2 are examples describing the packet routing mechanism of these two mentioned wireless networks.

FIG. 1A and FIG. 1B show schematic views for a packet routing mechanism of a 3GPP mobile network. Refer to FIG. 1A, a channel is established before an UE begins to access the service to reserve the network resources from the UE to the P-gateway (P-GW) of a core network 102. The UE may establish many EPS (Evolved Packet System) bearers to access different services. In the packet routing mechanism of an established EPS bearer, there is a logic channel A between the UE and a home eNode B (marked as HeNB), a GRPS Tunneling Protocol-User Plane (GTP-U) tunnel between the HeNB and an S-gateway (S-GW), and a GTP-u tunnel between the S-GW and a P-GW. The HeNB receives packets through the logical channel A, uses a look-up table to know the corresponding GTP-u tunnel for the S-GW; the S-GW may also query a routing table to find the corresponding tunnel for the P-GW. For example, a bearer context 110 of the UE corresponds to a Traffic Flow Template (TFT) recording the information of the logical channel A; the HeNB may query the table 120 according to the information of the logic channel A to find two Tunnel End (TE) identifiers (IDs) of a GTP-u tunnel between the HeNB and the S-GW, i.e. the TEID 1 of the HeNB and the TEID 2 of the S-GW. A table 120 records the information of the logical channel A between the UE and the HeNB, and two TEIDs of the GTP-u channel between the HeNB and the S-GW. The S-GW may also query a table 130, to find two TEIDs of another GTP-u tunnel between the S-GW and the P-GW, i.e. the TEID 4 of the S-GW and the TEID 3 of the P-GW. The table 130 records two TEIDs of the GTP-u tunnels between the HeNB and the S-GW, and two TEID of the other GTP-u tunnels between the S-GW and the P-GW. A table 140 of the P-GW also corresponds to a traffic flow pattern to record two TEIDs of another GTP-u tunnels, i.e. the TEID 4 of the S-GW and the TEID 3 of the P-GW. The bearer context 110, the table 120, the table 130, and the table 140 are stored respectively in the corresponding bearer of a connection management system in the 3GPP mobile network. The downlink packets may also be transmitted to the UE by using the same packet routing principle. FIG. 1B illustrates each corresponding protocol stack of the UE, the HeNB, the S-GW, the P-GW, and the application server in the 3GPP mobile network of FIG. 1A.

FIG. 2A and FIG. 2B show schematic views for a packet routing mechanism of a WiFi network, wherein a WiFi access point (AP) simultaneously supports the interface of the WiFi network and the Ethernet (Ethernet) and connects with an Asymmetric Digital Subscriber Line (ADSL) 230. Refer to FIG. 2A, the ADSL 230 and the WiFi AP 220 may use the Address Resolution Protocol (ARP) to obtain the MAC address of the next transmit node. Therefore, as shown in a content of the table 210, in an uplink packet of the UE, the destination MAC address is filled in the WiFi MAC address MAC2 of the WiFi AP. After the packet is received by the WiFi AP 220, it is transmitted on the Ethernet 222, and the Ethernet MAC address MAC3 of the WiFi AP 220 is filled in the field of the source MAC address, as shown in the content of a table 234. The destination MAC address is filled in the MAC address (i.e. MAC4) of the ADSL 230, as shown in the content of a table 224. After the packet information is received by the ADSL 230, the packet is transmitted by an Internet Protocol (IP) routing mechanism. The downlink packets may also be transmitted to the UE by using the same packet routing mechanism. FIG. 2B illustrates each corresponding protocol stack of the UE, the WiFi AP, the ADSL, and the application server in the WiFi network of FIG. 2A. In the protocol stack corresponding to the WiFi AP, a WiFi interface protocol 212 and an Ethernet interface protocol 222 are documented.

There are many existing network integration technologies, such as the integration technology of the WiFi/WiMAX and the 3GPP networks. A technology uses the NAS protocol, wherein the UE first transmits the WLAN capabilities to the service node (SGSN) in GPRS (General Packet Radio Service), the SGSN then forwards it to the WAG, to solve how to transmit the WLAN capabilities of the wireless transmit/receive unit (WTRU) for dual-mode mobile phone GPRS/Wireless LAN (WLAN) or Universal Mobile Telecommunications System (UMTS)/WLAN to the network side. Another technology develops a handover procedure, and the source-initiated handover is strengthen in this procedure, i.e., the handover request is initiated by the base station of the mobile network, to allow a dual-mode device be handed in by the mobile network to the wireless local area network. Yet another technology discusses the bandwidth aggregation and proposes the solution for the network layer, and the discussion focuses on the IP packet reordering.

After understanding the routing mechanisms of the above mentioned wireless networks having or not having a connection management, it may be seen that the current mobile device (such as mobile phone) supporting such as the WiFi network may connect to the Internet by selecting only one of the routing mechanisms of the wireless network having the connection management (such as the 3GPP network) and the wireless network not having the connection management (such as the WiFi network). Therefore, the base station of a wireless network having the connection management (such as the 3GPP network) must encapsulate packets in the correct tunnel for the uplink transmission. Thus using a wireless network not having the connection management (such as the WiFi network) to transmit packets of such as the 3GPP network needs to have enough information to find the correct uplink tunnel.

Therefore, it is an important issue on how to design a bandwidth aggregation technology for radio accessing on multi-networks that may allow the packets belonging to a same session to simultaneously take paths on multi-networks between the base station and the UE, and then merge into the same tunnel at the other site.

SUMMARY

The exemplary embodiments of the disclosure may provide an apparatus and method of bandwidth aggregation for radio accessing on multi-networks.

One exemplary embodiment relates to a method of bandwidth aggregation for radio accessing on multi-networks. The method comprises: through a first network, exchanging or setting, between a user equipment (UE) on the first network and a network device supporting both the first network and a second network, a second network information of each other.

Another exemplary embodiment relates to a method of bandwidth aggregation for radio accessing on multi-networks. The method comprises: establishing, by a user equipment (UE) and a core network of a first network, at least one first network dedicated bearer between the UE on the first network and a network device supporting both the first network and a second network; and according to an information of the at least one first network dedicated bearer, transmitting one or more data packets belonging to the at least one first network dedicated bearer by using both the first and the second networks.

Yet another exemplary embodiment relates to an apparatus of bandwidth aggregation for radio accessing on multi-networks, configured in a user equipment (UE) on a first network. The apparatus comprises a first network module configured to exchange a first information with a first network element of a network device; a second network module configured to exchange a second information with a second network element of the network device; and a controller configured to exchange, through the first network and between a user equipment (UE) on the first network and a network device supporting both the first network and a second network, a second network information of each other, establish at least one first network dedicated bearer, and according to an information of the at least one first network dedicated bearer, transmit/receive one or more data packets by using the first and the second networks.

Yet another exemplary embodiment relates to an apparatus of bandwidth aggregation for radio accessing on multi-networks, configured in a network device supporting both a first network and a second network. The apparatus comprises a first network module configured to exchange a first information with a first network module of a user equipment (UE), and exchange information with a core network; a second network module configured to exchange a second information with a second network module of the UE; and a controller configured to exchange between the UE on the first network and the network device, a second network information of each other through the first network module, establish at least one first network dedicated bearer, and according to an information of the at least one first network dedicated bearer, transmit/receive one or more data packets by using the first and the second networks.

BRIEF DESCRIPTION OF THE DRAWINGS

FIG. 5 shows four schemes, for UE, for knowing the WiFi ID of the HeNB+ through the 3GPP network, according to exemplary embodiments.

FIG. 6A, FIG. 6B, and FIG. 6C shows three schemes, for HeNB+, for knowing the WiFi ID of the UE through the 3GPP network, according to exemplary embodiments.

FIG. 8 shows a second scheme for the HeNB+ to identify the uplink WiFi data frames to be transmitted, according to an exemplary embodiment.

FIG. 12B and FIG. 12C show schematic views illustrating the user plane protocol stack of the UE, according to two exemplary embodiments.

FIG. 13A shows a schematic view of the user plane protocol stack and the data path of the HeNB+ using existing technologies, FIG. 13B and FIG. 13C show schematic views illustrating the user plane protocol stack and the data path of the HeNB+, according to two exemplary embodiments.

DETAILED DESCRIPTION OF DISCLOSED EMBODIMENTS

Figure 1:
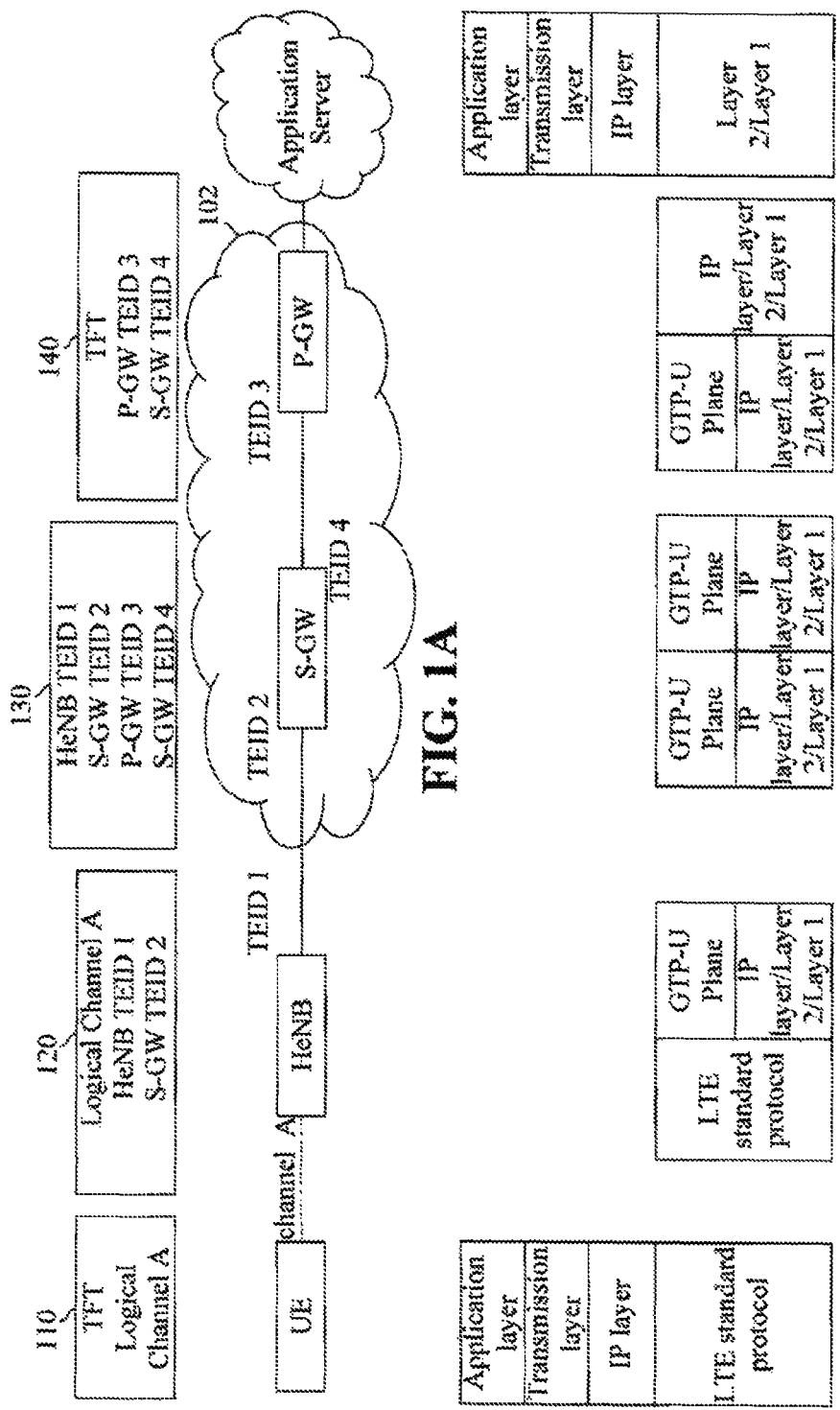
FIG. 1A and FIG. 1B show schematic views for a packet routing mechanism of a 3GPP mobile network.
Figure 2:
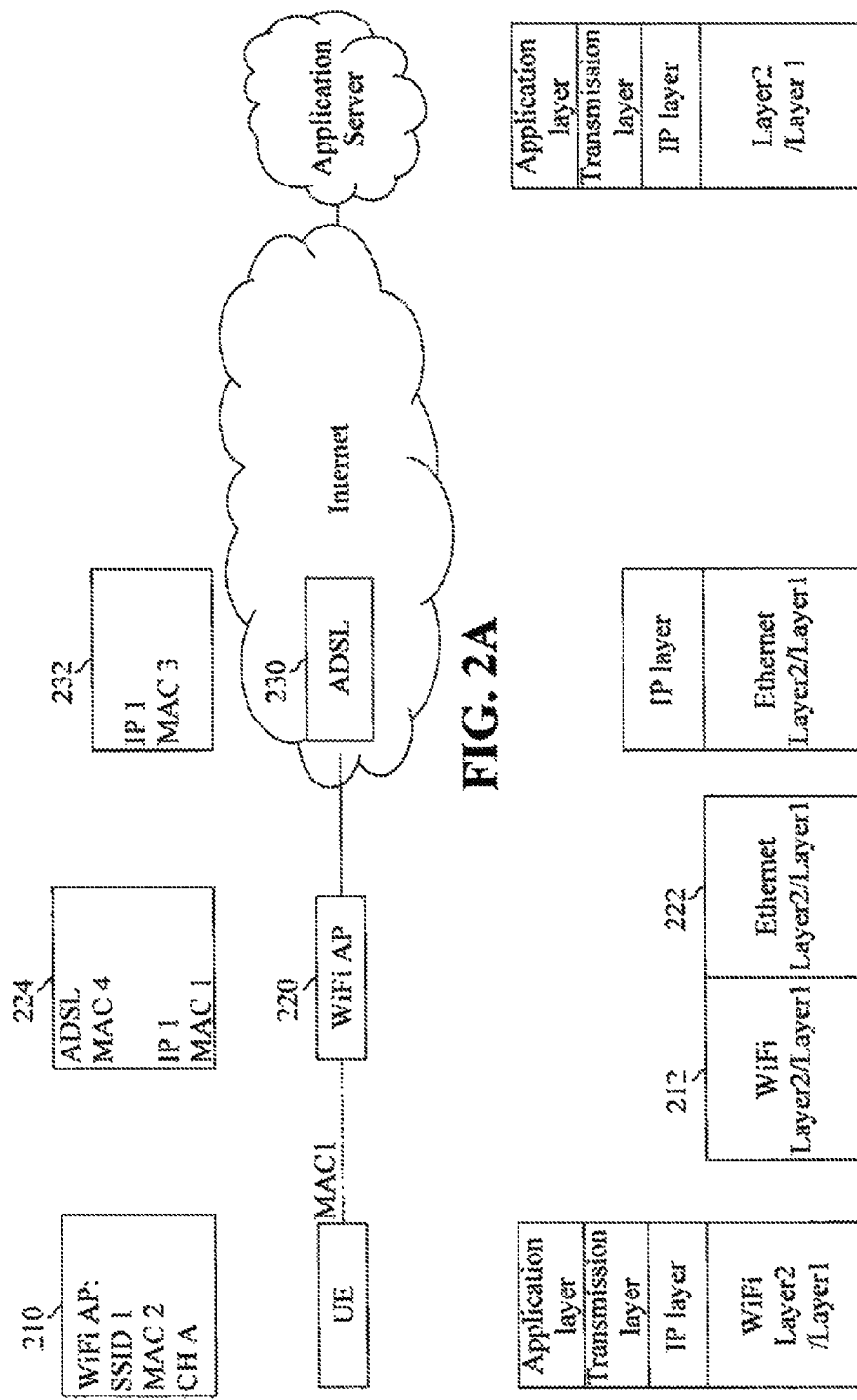
FIG. 2A and FIG. 2B show schematic views for a packet routing mechanism of a WiFi network.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The exemplary embodiments in the disclosure provide a technique of bandwidth aggregation for radio accessing on multi-networks. This technique divides a same IP flow between a UE on a first network and a network device into two flows. Each of these flows takes different radio path, and then integrated into a flow at both ends of the radio paths. In the exemplary embodiments, the network device is defined to support a first wireless network (such as but not limited to 3GPP network, WiMAX network, LTE network) and a second wireless network (such as but not limited to WiFi network) at the same time. The first wireless network is a wireless network having a connection management, wherein a connection is established before the UE to be connected, and the UE is configured with a dedicated bandwidth, its radio access is achieved by a non-contention based Media Access Control (MAC) technology. The second wireless network is a wireless network not having a connection management, wherein when the UE desires a connection, the UE only needs to connect a network, and the dedicated bandwidth is not necessary for the UE. The radio access for the UE is achieved by a contention-based MAC technology. The following illustrates exemplary embodiments by taking the 3GPP network as a first wireless network, the WiFi network as a second wireless network, and a home base station (HeNB+) as a network device, wherein the HeNB+ is a network device supporting both the first network and the second network, but are not limited to the exemplary embodiments of the disclosure.

Figure 3:
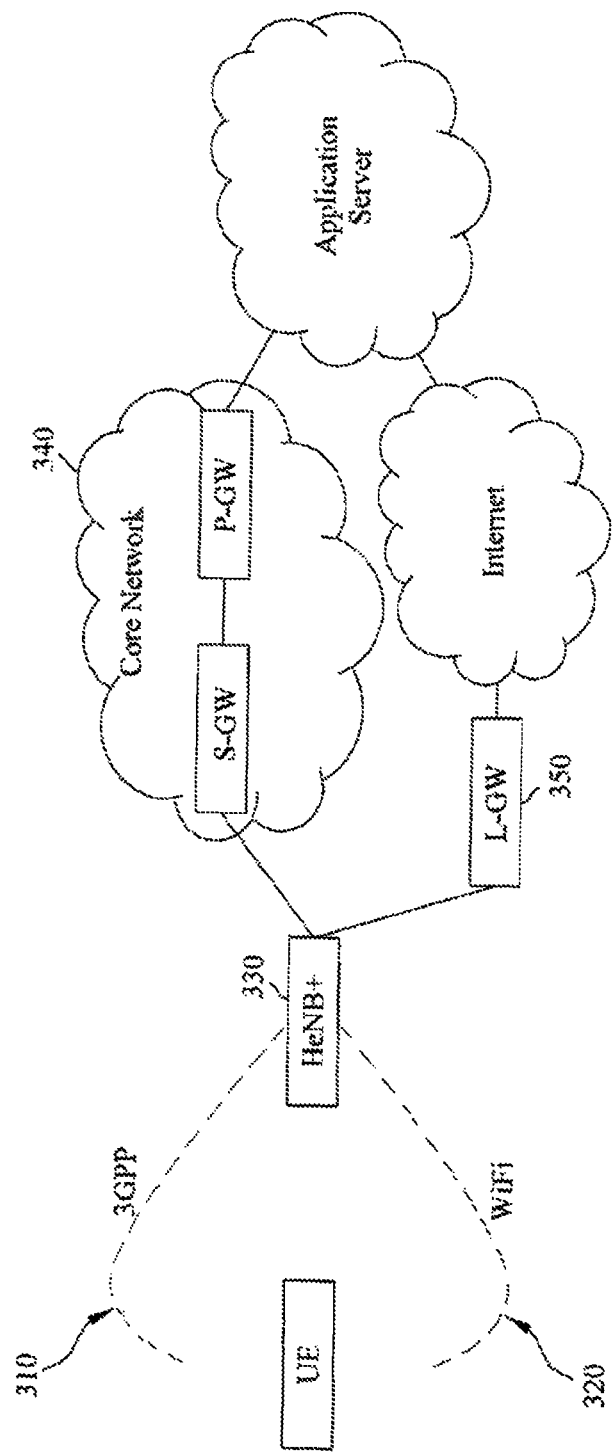
FIG. 3 shows a schematic view illustrating a HeNB+ side integrates the wireless network bandwidth within a distance near two ends of a wireless path, according to an exemplary embodiment.

When the HeNB+ and the UE both support the WiFi network, the network bandwidth may be greater if the WiFi network bandwidth is included in the integrated usage. As shown in FIG. 3, the technique of bandwidth aggregation for radio accessing on multi-networks divides an IP flow between the UE and the HeNB+ into two flows, each flow may go a 3GPP radio path 310 or a WiFi radio path 320, and then merged into one flow at two ends of the radio paths; and reverse versa. When the 3GPP network of the UE and the WiFi network operate at the same time, the WiFi network interface may detect multiple WiFi APs, thus the UE needs to have enough information to identify the WiFi AP associated with the HeNB+. When multiple UEs try to use the WiFi interface of the HeNB+, the HeNB+ needs enough information to identify which UE confines the 3GPP authentication and authorization. When the UE has established a 3GPP connection, and at the same time uses the WiFi network to transmit and receive packet(s), the HeNB+ needs enough information to identify WiFi packet(s) belongs to which connection. In other words, in the bandwidth aggregation technique for radio accessing on multiple networks, both ends of the HeNB+ and the UE need mutually knowing each other's WiFi ID. The UE may establish different EPS bearers for different services, thus after the HeNB+ receives the WiFi packet transmitted from the UE, the HeNB+ should be able to select the correct tunnel to transmit the uplink packet(s); and vise versa.

That is, according to a network device (i.e. HeNB+) supporting both the 3GPP network and the WiFi, which is defined by the exemplary embodiments of the disclosure, when the UE establishes an EPS bearer on the 3GPP network, the HeNB+ may use the 3GPP network and the WiFi network to transmit and receive packets within a distance near the ends of the radio paths. In other words, the uplink packets are integrated at the HeNB+ 330 and are further transmitted to a core network 340. In addition, when this EPS bearer is established, the mechanism such as Local IP Access (LIPA) or Selected IP Traffic Offload (SIPTO) is decided to be used for offload of the core network 340, and the packets are transmitted to an L-GW 350 after being integrated.

Figure 4A:
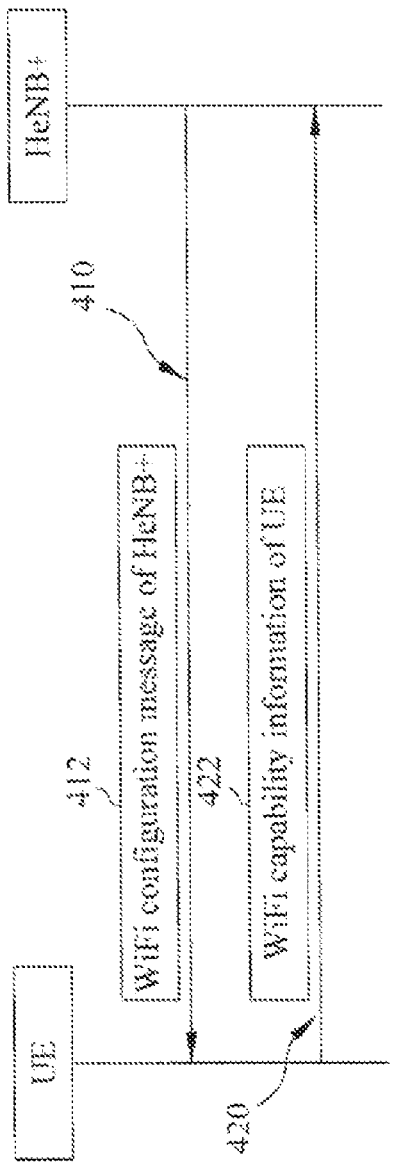
FIG. 4A shows a method of bandwidth aggregation for radio accessing on multi-networks, according to an exemplary embodiment.

Accordingly, FIG. 4A shows a method of bandwidth aggregation for radio accessing on multi-networks, according to an exemplary embodiment. Refer to FIG. 4A, in step 410, the HeNB+ transmits WiFi configuration message(s) 412 of the HeNB+ to the UE. In step 420, the UE transmits WiFi capability information 422 of the UE to the HeNB+. In steps 410 and 420, the UE and the HeNB+ may exchange each other's WiFi network message through the 3GPP network (the first network), thereby knowing each other's WiFi ID from the exchanged WiFi network message(s). The WiFi configuration message(s) 412 of the HeNB+ includes such as the Service Set Identifier (SSID), the channel number (CH number), the supported WiFi mode. The WiFi capability information 422 of the UE includes such as the MAC address, the supported WiFi mode. The supported WiFi mode is such as WLAN technology standard 802.11a, 802.11b, 802.11g, 802.11n, etc.

In other words, according to an exemplary embodiment of the disclosure, the method of bandwidth aggregation for radio accessing on multi-networks may comprise: through a first network, exchanging or setting a second network information between a user equipment (UE) on the first network and a network device supporting both the first network and a second network. The second-network configuration message of the network device and the second-network capability information of the UE may be achieved by using setting schemes. The following will describe the detailed.

Figure 4B:
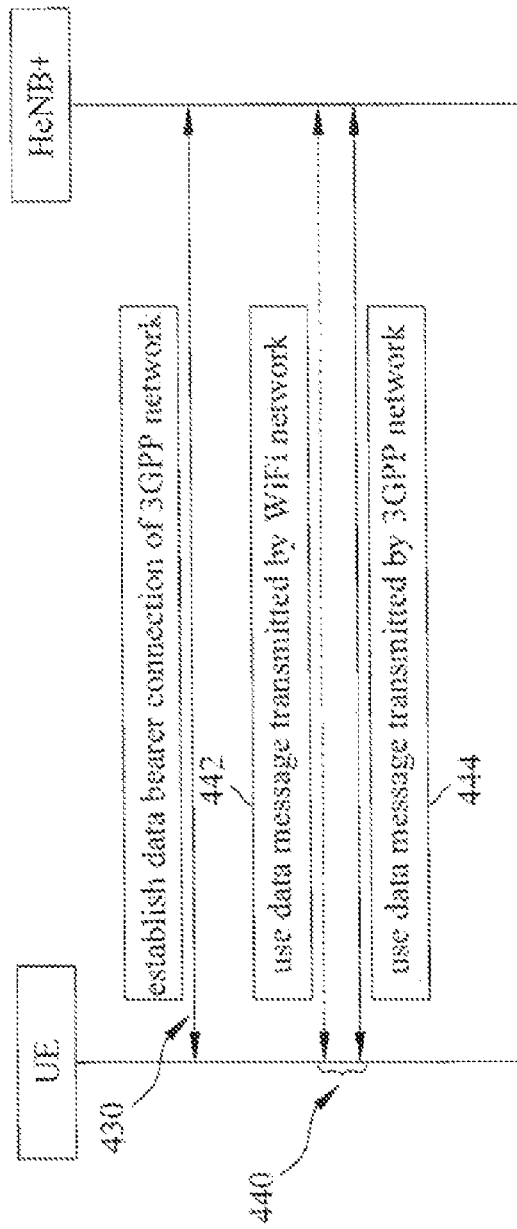
FIG. 4B shows a method of bandwidth aggregation for radio accessing on multi-networks, according to another exemplary embodiment.

FIG. 4B shows a method of bandwidth aggregation for radio accessing on multi-networks, according to another exemplary embodiment. Refer to FIG. 4B, In step 430, an Evolved Packet Service bearer (EPS bearer) connection of the 3GPP network (first network) is established between the UE and the HeNB+ to identify at least one 3GPP network dedicated channel, for transmitting one or more WiFi data frames. Since the 3GPP network dedicated channel must be established before the UE on the original 3GPP network transmits/receives packets, that is, in step 430, the UE establishes at least one 3GPP network (first network) dedicated channel between the UE and the HeNB+, so that the WiFi network (second network) may be used to transmit and receive at least one user data packet. In step 440, between the UE and the HeNB+, based on the information of the at least one 3GPP network dedicated channel, both the 3GPP network (first network) and the WiFi network (second network) are used to transmit multiple data frames, wherein the data frames on the real line represents the transmitted data frames 444 by using the 3GPP network (first network), the data frames on the dotted line represents the transmitted data frames 442 by using the WiFi network (second network).

In other words, according to another exemplary embodiment of the disclosure, the method of bandwidth aggregation for radio accessing on multi-networks may comprise: establishing at least one first network dedicated channel between the UE on a first network and a network device supporting both the first network and a second network; and according to an information of the at least one first network dedicated channel, transmitting one or more data packets belonging to the at least one first network dedicated channel by using both the first and the second networks.

The following illustrates several schemes for the UE knowing the second network ID (such as WiFi SSID) of the network device (such as HeNB+) through the first network (such as 3GPP network).

In step 410, the HeNB+ may use several schemes to transmit the WiFi configuration message 412 of the HeNB+ to the UE through the 3GPP network, so that the UE may know the WiFi ID of the HeNB+. FIG. 5 shows, but not be limited to, four schemes for the UE knowing the WiFi ID of the HeNB+ through the 3GPP network, according to exemplary embodiments. According to the first scheme, the HeNB+, in the WiFi configuration message 412, sets the SSID of the WiFi AP to the global cell identifier (Global cell ID) or the Closed Subscriber Group (CSG) ID, so that the UE may know the WiFi ID of the HeNB+. This is because that the global cell ID is the system information of the HeNB+ to be broadcasted on the original 3GPP network. In the first scheme, since the maximum length for the SSID is 32 characters, while the global cell ID is 10 characters, so the SSID has an enough space to store the global cell ID, therefore, it is a feasible scheme.

According to the second scheme, in addition to the 3GPP Radio Access Network (RAN) information originally defined in the broadcast system information (SIB), the HeNB+ adds the WiFi configuration information in the SIB and broadcasts the updated SIB. According to the third scheme, in addition to the 3GPP RAN information originally defined in the dedicated Radio Resource Control (RRC) messages, the HeNB+ adds the WiFi configuration information in the dedicated RRC message, such as radio resource configuration message and measurement configuration message, and unicasts the message to the UE. According to the fourth scheme, the Mobility Management Entity (MME) transmits the WiFi configuration message through the newly defined Non-Access Stratum (NAS) message; the NAS is an protocol between the MME and the UE, so that after the MME knows the UE on the connection line from which HeNB+, it may obtain the WiFi ID information by using such as the look-up table, and use the newly defined NAS message to transmit the WiFi ID information to the UE.

Figure 6C:
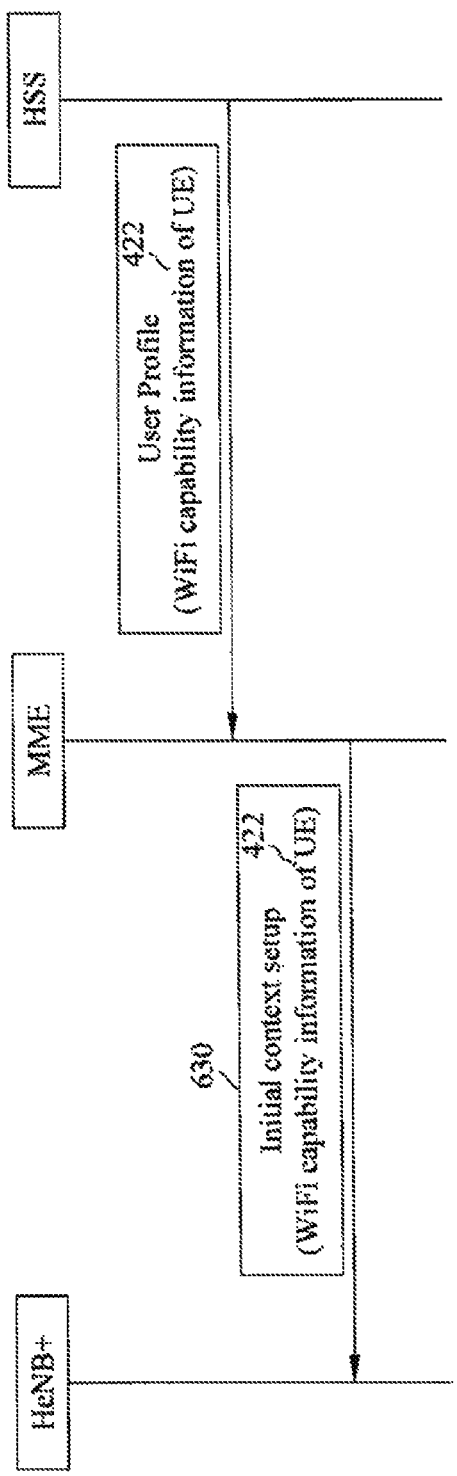

In step 420, the UE may use several schemes to transmit WiFi capability information 422 of the UE to the HeNB+ through the 3GPP network, so that the HeNB+ may know the WiFi ID of the UE. FIG. 6A, FIG. 6B and FIG. 6C shows three schemes, for HeNB+, for knowing the WiFi ID of the UE through the 3GPP network, according to exemplary embodiments. According to the scheme in FIG. 6A, the UE transmits the WiFi capability information, such as WiFi MAC address, in the newly defined information element of dedicated RRC message. For example, in the RRC protocol, UE may provide various Radio Access Technology (RAT) capabilities to HeNB+ via the UE capability enquiry procedure as shown in FIG. 6A. The enquired RAT capability is such as the Eutra, the Geran-cs, the Geran-ps, the Utra, the CDMA2000-1xRTT etc. Thus, WiFi information element may be defined in the UE capability information message to respond to the enquiry of the HeNB+.

According to the scheme in FIG. 6B, the UE may put the WiFi capability information in new defined information element in "UE radio capability" information element, which will be included in the attach request message performed by the MME and the UE. The UE radio capability may be entrained in the "initial context setup" message 620 of S1AP protocol and be sent to HeNB+. In FIG. 6C, the MME could obtain the WiFi capability of UE from HSS (Home Subscriber Server). Then the UE WiFi capability may also be entrained in the "initial context setup" message 630 of S1AP protocol and be sent to HeNB+.

Figure 7:
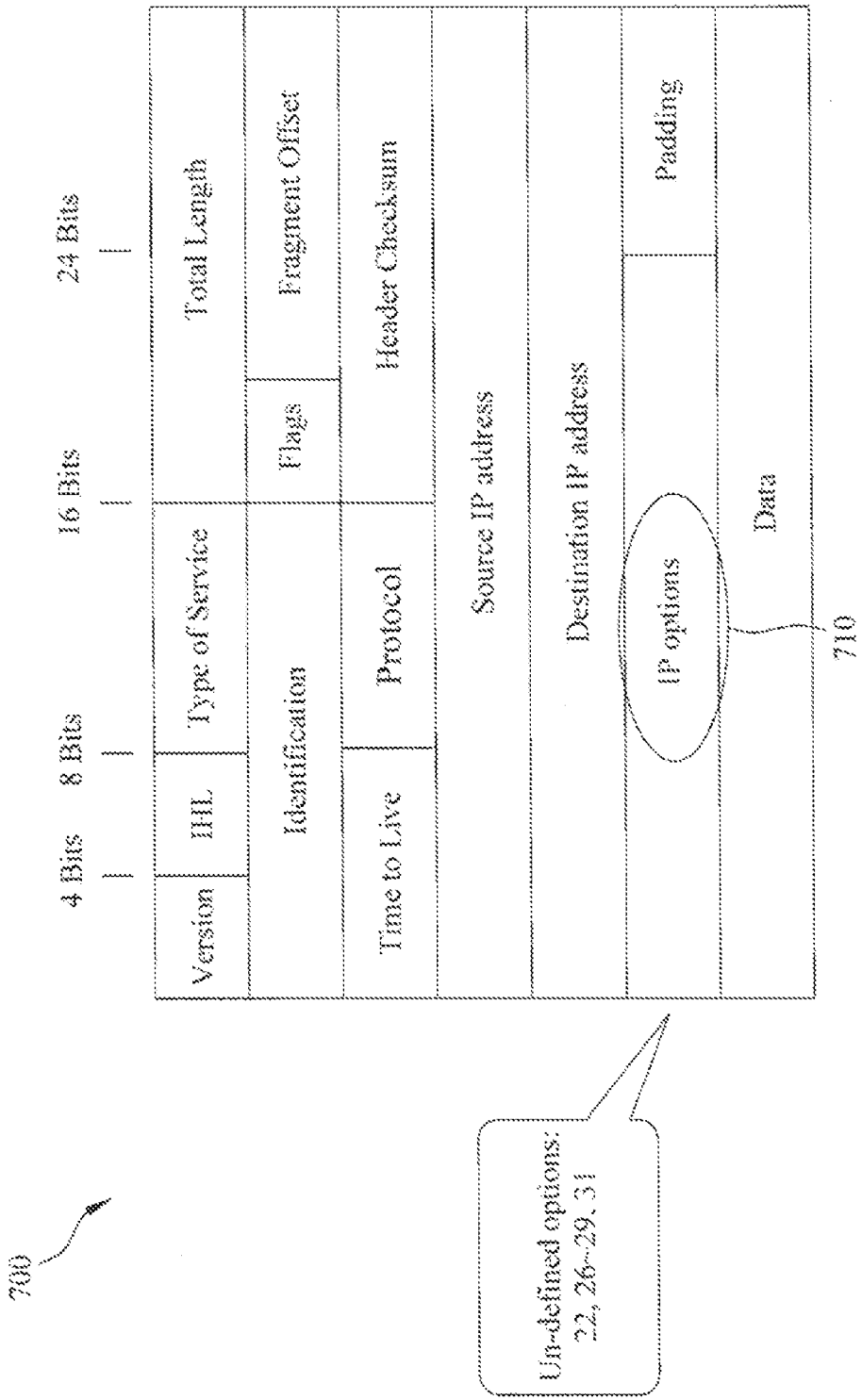
FIG. 7 shows a first scheme for the HeNB+ to identify the uplink WiFi data frames to be transmitted, according to an exemplary embodiment.

In step 430, the UE and the 3GPP network first establish the 3GPP network (first network) dedicated bearer to simultaneously use the WiFi network (second network) to transmit and receive at least one WiFi packet. Therefore, the HeNB+ needs to identify the uplink or downlink WiFi data frame(s) belonging to the WiFi packet(s) of which channel. There are several schemes that may allow the HeNB+ to identify the WiFi data frame(s) belonging to the WiFi packet(s) of which channel. To identify the uplink WiFi data frame(s), three methods may be taken, but not limited to, for allowing the HeNB+ to identify the WiFi data frame(s). According to the first method, as shown in FIG. 7, the UE may use such as an IP option field 710 in an IP header 700 to regulate an enhanced Radio Access Bearer (eRAB) ID information, wherein the IP option field 710 has undefined options 22, 26 to 29, and 31.

According to the second method, the UE may use a WiFi MAC header field to regulate the eRAB ID information, for example, use the address 4 of four address fields in the WiFi MAC header to regulate the eRAB ID information. Usually the address 4 of the WiFi architecture has not yet been used, and the address 4 is used for a special case of using a wireless distributed system, and the bit TO DS (to destination) and the bit From DS (from destination) are set to 1 when the data frame is transmitted from an AP to another AP. According to the usage content of the four addresses in the WiFi MAC header shown in FIG. 8, the bit TO DS (to destination) and the bit From DS (from destination) are not simultaneously be set to 1, the address 4 has not been used in this WiFi architecture. Thus, the field (address 4) is used to regulate the eRAB ID information. For example, when the bit TO DS is set to 0 and the bit From DS is set to 1, the address 4 is used to bear the downlink eRAB ID information; while the bit TO DS is set to 1 and the bit From DS is set to 0, the address 4 is used to bear the uplink eRAB ID information.

Figure 9A:
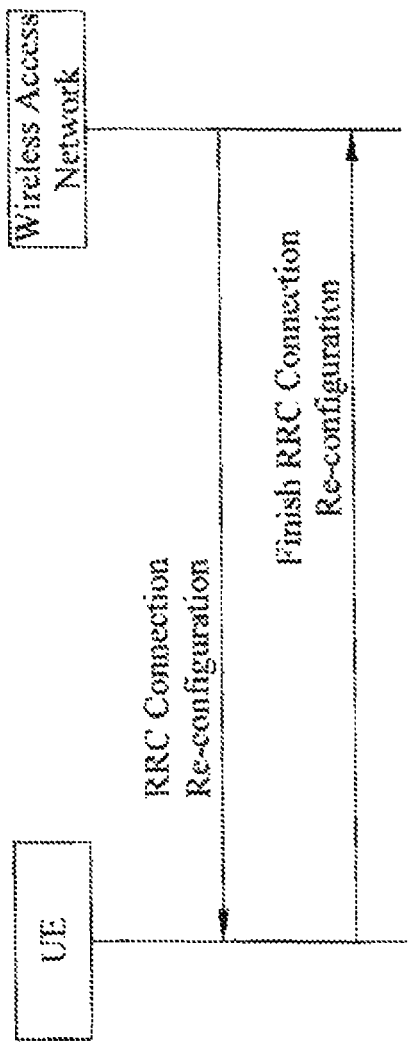
FIG. 9A and FIG. 9B show a third scheme for the HeNB+ to identify the uplink WiFi data frames to be transmitted, according to an exemplary embodiment.
Figure 9B:
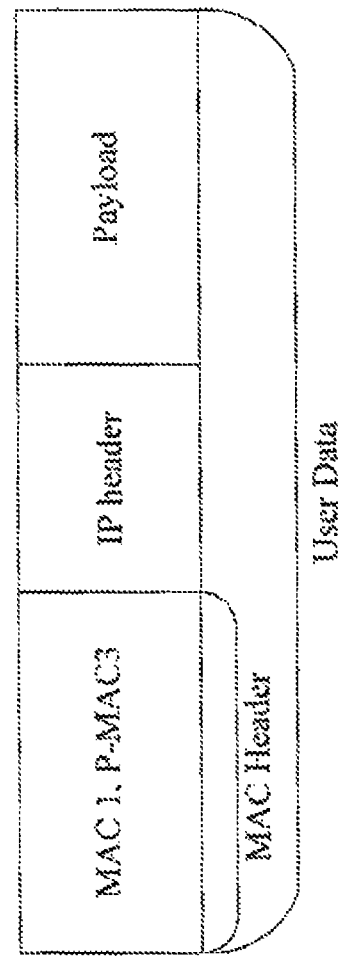

According to the $3^{rd}$ method, as shown in FIG. 9A, when the UE establishes the 3GPP network (first network) dedicated bearer, the RRC connection reconfiguration message is used to configure the radio resources, at same time the HeNB+ may specify a private WiFi MAC address to an eRAB. When the UE uses the second network to transmit the uplink channel packet(s), the private WiFi MAC address may be filled into a destination address field in the WiFi MAC header, as shown in FIG. 9B.

Figure 10:
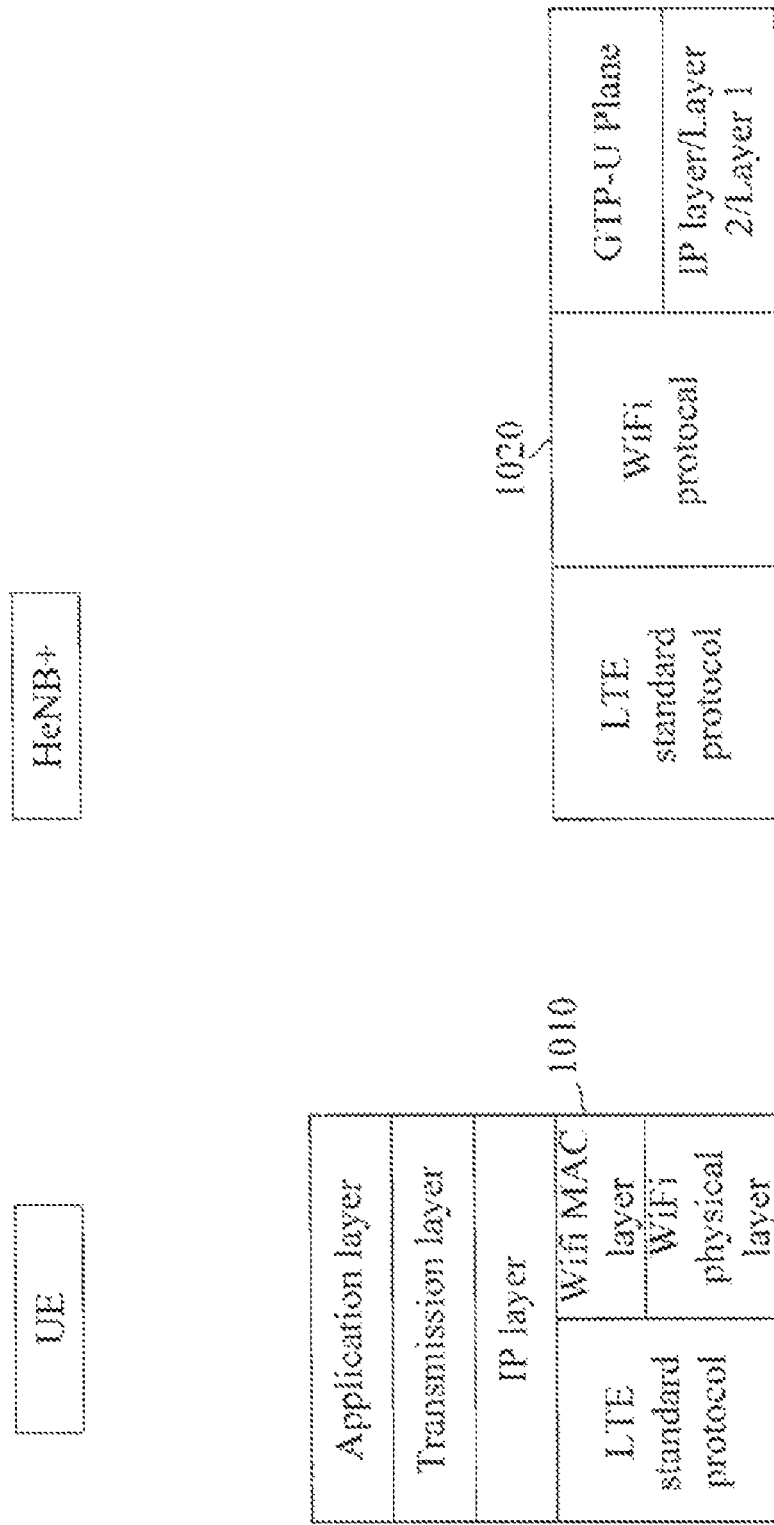
FIG. 10 shows a scheme for the UE to identify the downlink WiFi data frames to be transmitted, according to an exemplary embodiment.

The following illustrates the method for allowing the UE to identify the downlink WiFi data frame(s) when the HeNB+ uses the WiFi network to transmit data messages belonging to the 3GPP network dedicated bearer. As shown in FIG. 10, when the HeNB+ uses the WiFi network to transmit downlink packet(s), the HeNB+ may fill a WiFi MAC address of the UE into a field of a WiFi protocol 1020 in the WiFi MAC header, so that the UE may identify the downlink WiFi data frame(s) and receive the WiFi packet(s) via the WiFi MAC layer 1010, then use the information in the IP layer and the TCP/UDP layer to transmit the WiFi packet(s) to a correct application in the application layer.

Figures 11A, 11B:
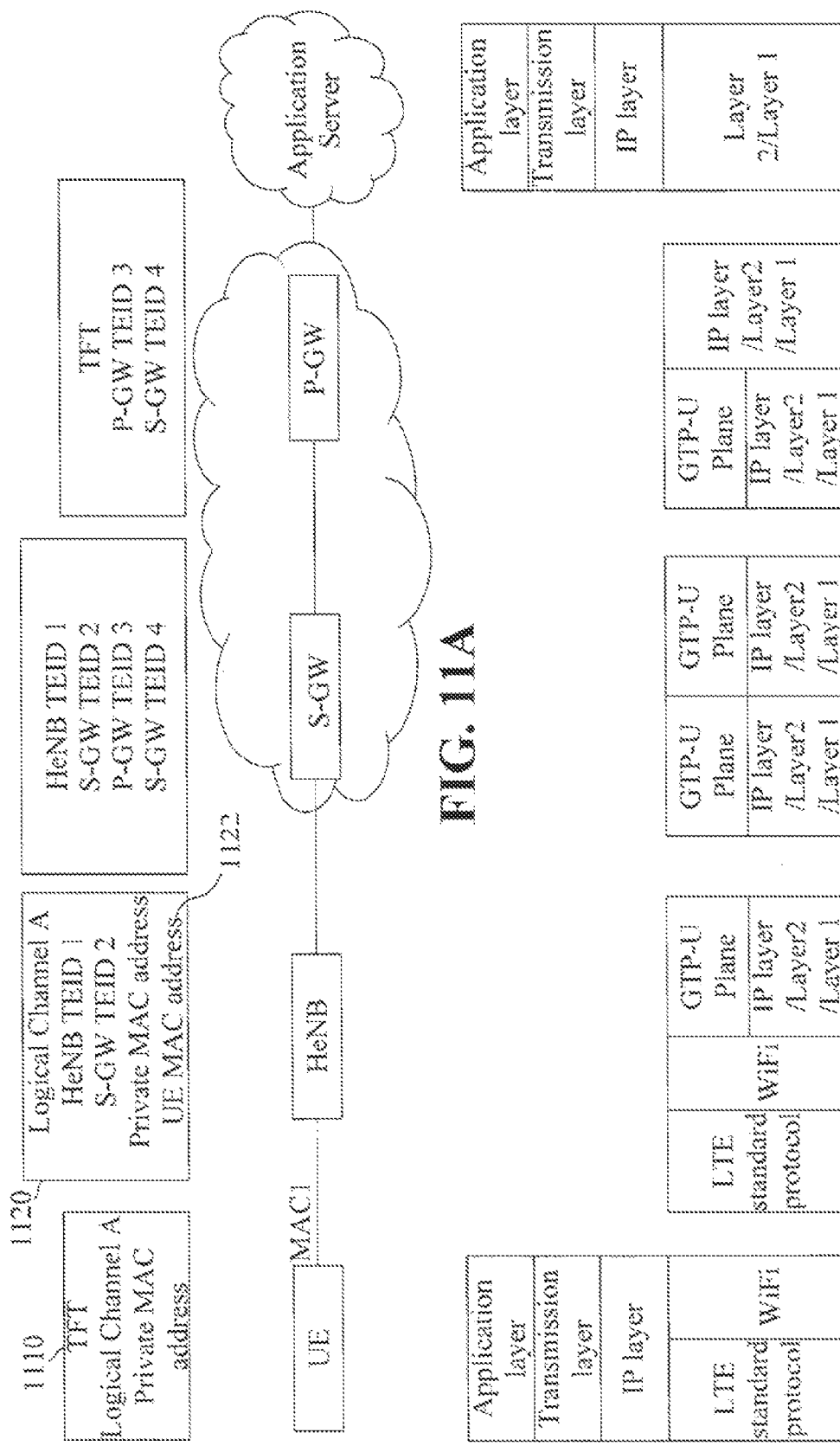
FIG. 11A and FIG. 11B show a schematic view illustrating a packet routing mechanism, according to an exemplary embodiment.

Accordingly, FIG. 11A and FIG. 11B show a schematic view illustrating a packet routing mechanism, according to an exemplary embodiment, wherein the HeNB+ is a device supporting both a first network (such as the LTE network) and a second network (such as the WiFi network). As shown in FIG. 11A, some WiFi information is added when the UE establishes a channel A. For example, a private WiFi MAC address 1110 is configured so that the same IP flow may go the LTE network or the WiFi network, the uplink packet(s) at the HeNB+ side may use a lookup table 1120 to find the correct S-GW TEID for transmission according to the private WiFi MAC address 1110. And the downlink packet(s) at the HeNB+ side may also use the lookup table 1120 to find a correct UE WiFi interface (i.e., an UE MAC address 1122), thus the HeNB+ may use the WiFi network to transmit the downlink packet(s) to the UE. FIG. 11B shows the respective corresponding protocol stack of the UE, the HeNB+, the S-GW, the P-GW, and the application server in two networks (the LTE network and the WiFi network) of FIG. 11A. According to the mentioned exemplary embodiments, the following further describes the user plane protocol stacks of the UE and the HeNB+, respectively.

Figure 12A:
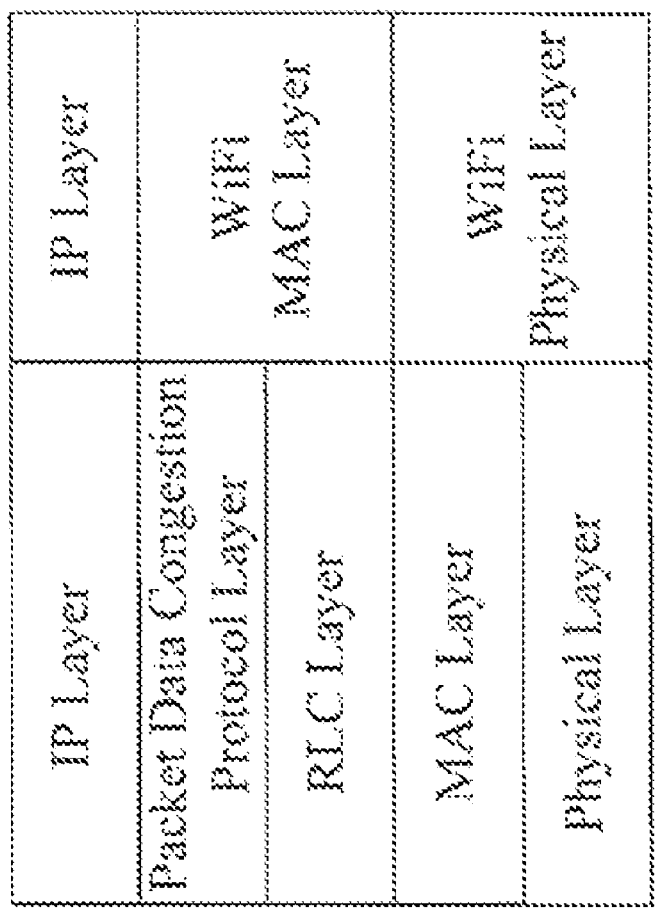
FIG. 12A shows a schematic view illustrating a user plane protocol stack of the UE using existing technologies.

FIG. 12A shows a schematic view illustrating a user plane protocol stack of the UE using existing technologies, FIG. 12B show a schematic view illustrating a user plane protocol stack of the UE, according to an exemplary embodiment, and FIG. 12C show a schematic view illustrating a user plane protocol stack of the UE, according to another exemplary embodiment. FIG. 12A illustrates that the current mobile device, such as mobile phone, while simultaneously supports the 3GPP and the WiFi interface, but each has its own IP address, so may only choose one for on line. According to the user plane protocol stack of the UE in FIG. 12B or FIG. 12C, the original packet(s) going the WiFi interface does not change, but the original packet(s) going the 3GPP network may also go the WiFi interface to the HeNB+.

Figures 13B, 13C:
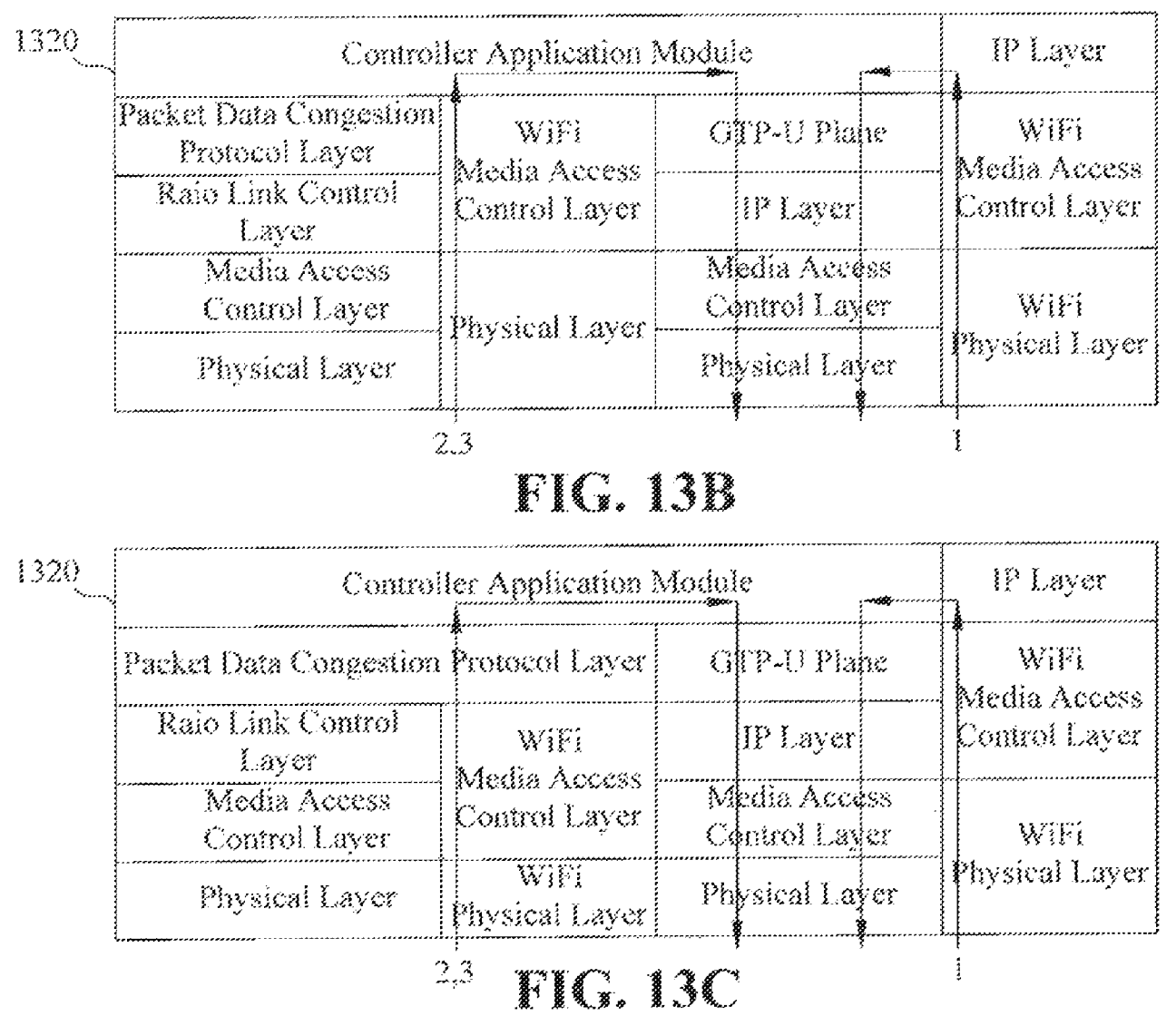

FIG. 13A shows a schematic view of a user plane protocol stack and a data path of the HeNB+ using existing technologies, FIG. 13B show a schematic view illustrating a user plane protocol stack and a data path of the HeNB+, according to an exemplary embodiment. FIG. 13C show a schematic views illustrating a user plane protocol stack and a data path of the HeNB+, according to another exemplary embodiment. In FIGS. 13A, 13B, and 13C, a controller application module 1320 is responsible for downlink the GTP packets from a core network to a wireless network in the 3GPP system implementation, and vice versa. The existing technology of FIG. 13A illustrates the integration of the HeNB+ and WiFi in a same system, but actually they are two independent modules in the system.

In the exemplary embodiment of FIG. 13B when the system uses the first method of FIG. 7, as shown by the data path of label 1, the uplink packet(s) may go to the IP layer. Once the IP option field 710 of the IP header having channel information is found, the uplink packet(s) may be transmitted to a controller application module 1320 for processing. The controller application 1320 transmits the uplink packet(s) in a correct GTP-u tunnel based on the bearer context information. When the system uses the second method of FIG. 8 or the 3$^{rd}$ method of FIG. 9A and FIG. 9B, as shown by the data path 2 and data path 3, uplink packet(s) may be transmitted directly to the controller application module 1320 to process by using the WiFi header information. Similarly, it may also be applied in the data paths 1 to 3 of the exemplary embodiment of FIG. 13C.

According to the exemplary embodiments, the predefined second network information (such as the WiFi network information in the above-mentioned) of the UE may also be transmitted to the network device (such as the HeNB+) through a management unit of a core network, such as an mobility management unit, an Operation, Administration, Maintenance (OAM) device management unit.

Figures 14A, 14B:
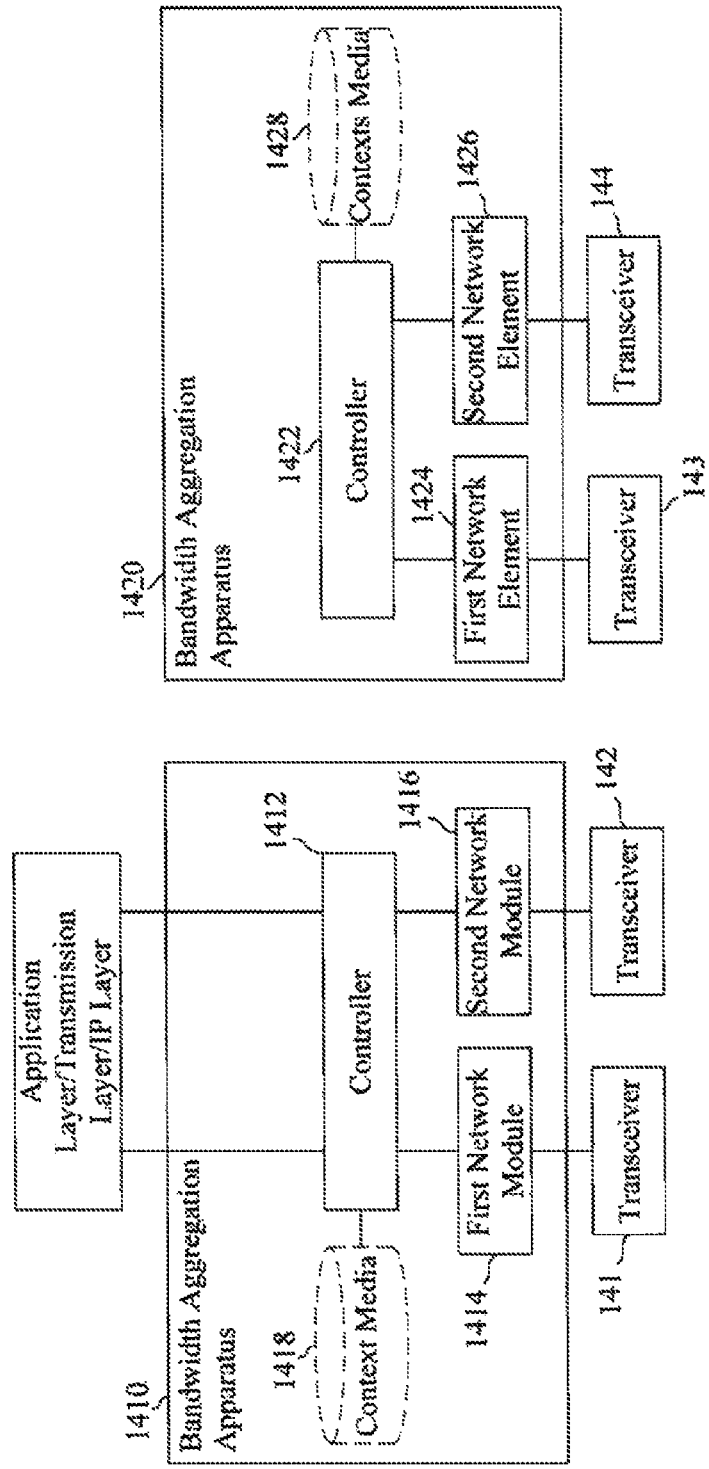
FIG. 14A shows an apparatus of bandwidth aggregation for radio accessing on multi-networks, wherein the apparatus is configured in the UE on the first network, according to an exemplary embodiment.
FIG. 14B shows an apparatus of bandwidth aggregation for radio accessing on multi-networks, wherein the apparatus is configured in the HeNB+ supporting the first network and the second network, according to an exemplary embodiment.

Accordingly, FIG. 14A and FIG. 14B shows an apparatus of bandwidth aggregation for radio accessing on multi-networks, according to an exemplary embodiment. Refer to FIG. 14A, an apparatus of bandwidth aggregation 1410 is configured in the UE on the first network, and the first network and the second network are used simultaneously to transmit packets belonging to a same bearer between the UE and the HeNB+ supporting the both networks. The apparatus of bandwidth aggregation 1410 may include a controller 1412, a first network module 1414, and a second network module 1416. The first network module 1414 and the second network module 1416 are connected to two respective transceivers, respectively, such as the transceivers 141~142. The first network module 1414 is configured to set at least one first network dedicated bearer information of the UE and provide the first network dedicated bearer information to the controller 1412. The first network module 1414 may receive the bearer context information from the transceiver 141, such as the aforementioned private MAC address, and provide the bearer contexts information to the controller 1412. The second network module 1416 is configured to set at least one second network related parameters combined with the UE, and provide the second network related parameters to the controller 1412. The second network identifier associated with the HeNB+, such as the aforementioned second network SSID of the HeNB+ may be transmitted to the UE through the first network, and further transmitted to the controller 1412. The controller 1412 then attaches the second network identifier associated with the HeNB+ on the second network through the at least one related parameter set by the second network module 1416. Through the first network module 1414 and the second network module 1416, the controller 1412 is configured to exchange the second network ID related information of the HeNB+ and the UE through the first network, establishes at least one first network dedicated bearer. Based on the information of the at least one first network dedicated bearer, the controller 1412 simultaneously uses the first and the second networks to transmit one or more data packets.

In the bandwidth aggregate apparatus 1410 configured in the UE, the controller 1412 may internally or externally connect a contexts media 1418. The contexts media stores the HeNB+ related context information, and the bearer context information. In addition to containing the existing bearer context information, the bearer context information further contains the new bearer context information, such as the aforementioned private MAC address. In addition to containing the existing network information, the HeNB+ related context information further contains the second network configuration message associated with the HeNB+, such as the aforementioned second network SSID of the HeNB+.

Refer to FIG. 14B, a bandwidth aggregation apparatus 1420 is configured in the HeNB+ supporting the first network and the second network, and the packets belonging to a same bearer may use the first and the second networks to transmit between the HeNB+ and the UE on the first network. The bandwidth aggregation apparatus 1420 may include a controller 1422, a first network element 1424, and a second network element 1426. The first network element 1424 and the second network element 1426 are respectively connected to two respective transceivers, such as the transceiver 143 to 144. According to at least one resource allocation made by the controller 1422, the first network element 1424 is configured to set at least one first network dedicated bearer information on the HeNB+ and provide the first network dedicated channel information to the controller 1422. The second network element is configured to set the second network information associated with the UE. The controller 1422 may obtain the second network information associated with the UE, such as the aforementioned newly added UE capability information, through the first network. Through the first network element 1424 and the second network element 1426, the controller 1422 is configured to exchange the respective second network message of the UE and the HeNB+, establishes at least one first network dedicated bearer. Based on the at least one first network dedicated bearer information, the controller uses the first and the second networks to transmit one or more data packets.

In the apparatus of bandwidth aggregation 1420 configured in the HeNB+, the controller 1422 may internally or externally connect to a contexts media 1428. The contexts media 1428 stores the UE related context information and the bearer context information. In addition to containing the existing bearer connection information, the bearer connection information further adds new bearer context information to identify the connection information belonging to the second network data packet(s) such as the aforementioned private MAC address. In addition to the existing second network information, the UE related context information further add new UE capability information, such as the aforementioned second network MAC address.

In the controllers 1412 and 1422, how the UE and the HeNB+ know the second network (such as WiFi network) message of the other side through the first network (e.g. the 3GPP network), such as in addition to previous exemplary description in FIG. 5 and FIG. 6, the following illustrates supplementary explanation. As previously described, the UE may use a RRC message to transmit its WiFi capability to the HeNB+. Thus, the controller 1412 of the transmitter UE may obtain a second network capability information (such as the MAC address) of the UE from the second network module 1416, and place the second network capability information of the UE in an information element of the dedicated Radio Resource Control (RRC) message, and use the network module 1414 to transmit to the HeNB+. The receiver HeNB+ may use the first network element 1424 to receive the second network capacity information of the UE in the RRC message, and require the second network elements 1426 to accept the connection request of the UE through the controller 1422. When the UE and the HeNB+ establish a dedicated bearer, the HeNB+ configures a private MAC address to the dedicated bearer.

As previously described, the UE may use the NAS to transmit its WiFi capability to the MME/SGSN. Thus, the controller 1412 of the transmitter UE may obtain a second network capability information (such as the MAC address) of the UE from the second network module 1416, and place the second network capability information of the UE in a NAS message information element, and further use the first network module 1414 to transmit to the core network node MME/SGSN. The receiver (MME/SGSN) may receive the second network capability information of the UE in the NAS message, and use a protocol (such as S1AP, RANAP) with the HeNB+ to forward the second network capability information of the UE to the HeNB+ connected with the UE. After the HeNB+ receives the second network capability information of the UE, the HeNB+ requests the second network element 1426 to accept the connection request of the UE through the controller 1422. When the UE and the HeNB+ establish a dedicated bearer, the HeNB+ configures a private MAC address to the dedicated bearer.

As previously described, the HeNB+ may set a SSID of a WiFi access point (AP) to a global cell ID or a closed user group ID (Cellular ID), and use an SIB to transmit to the UE. Therefore, the controller 1422 of the transmitter HeNB+ may set the related system parameter(s) (such as the SSID) of the second network element 1426 as the related system parameter(s) (such as Cellular ID) same as the first network element 1424. When the receiver UE uses the first network module 1414 to receive system parameters (such as cellular ID) of the first network, the receiver UE requests the network module 1416 through the controller 1412 to connect the AP fitting the system parameters. The transmitter HeNB+ places the system parameters (such as SSID) of the second network module in a related information field of a SIB message, and use the first network element 1424 to broadcast for transmitting to the UE. When the receiver UE uses the first network module 1414 to receive the system parameters (such as the SSID) of the second network module in the SIB message, the receiver UE requests the second network module 1416 through the controller 1412 to connect the AP fitting the system parameters.

As previously described, the HeNB+ may use a RRC message to transmit the SSID to the UE. Therefore, the transmitter HeNB+ may place the system parameters (such as the SSID) of the second network module in an information element of the RRC message, and use the first network element 1424 to transmit to the UE. When the receiver UE uses the first network module 1414 to receive the system parameters (such as the SSID) of the second network module in the RRC message, the receiver UE requests the second network module 1416 through the controller 1412 to connect the AP fitting the system parameters.

As previously described, a core network node MME/SGSN may use a NAS message to transmit the SSID to the UE. Therefore, a core network node (MME/SGSN) may place the system parameters (such as the SSID) of the second network elements 1426 of the HeNB+ connected with the UE in a related information element of a NAS message, and uses the first network element 1424 of the HeNB+ to transmit to the UE. When the receiver UE uses the first network module 1414 to receive the system parameters (such as the SSID) of the second network module in the NAS message, the receiver UE requests the second network module 1416 through the controller 1412 to connect the AP fitting the system parameters.

How the HeNB+ identifies the uplink second network data frame(s), and how the UE identifies the downlink second network data frame(s), in addition to the previous exemplary description of FIG. 7 to FIG. 10, the following illustrates supplementary description. As previously described, the UE may use the WiFi to transmit uplink data packet(s), and add the eRAB ID information in an IP header. Therefore, when the transmitter UE transmits the uplink data packet(s), the controller 1412 modifies the IP header to place the eRAB (eRAB ID) related information in the IP header, and uses the second network module 1416 to transmit to the HeNB+. The receiver HeNB+ uses the second network elements 1426 to receive the uplink data packet(s), and when its IP layer finds special header information, the IP layer transmits the packet(s) to the controller 1422. The controller 1422 identifies the eRAB related information in the IP header and finds a corresponding tunnel to transmit the uplink packets.

As mentioned previously, the UE may use the WiFi to transmit the uplink data packet(s) and add eRAB ID information in a MAC header. Thus, when the transmitter UE transmits the uplink data packet(s), the controller 1412 notifies the second network module 1416 to add eRAB related information (such as eRAB ID) in a MAC header, and uses the second network module 1416 to transmit to the HeNB+. The receiver HeNB+ uses the second network elements 1426 to receive the uplink data packet(s), and when the MAC layer finds special header information, the HeNB+ transmits the packet and the eRAB related information to the controller 1422. The controller 1422 identifies the eRAB related information and finds a corresponding tunnel to transmit the uplink packet(s).

As mentioned before, the HeNB+ may use the WiFi to transmit the downlink data packet(s) to the UE. Thus, when the transmitter HeNB+ transmits the downlink data packet(s), the controller 1422 may notify the second network element 1426 the second network MAC address of the UE, and use the second network element 1426 to transmit to the UE. The receiver UE uses the second network module 1416 to receive the downlink data packet(s), and transmits the data packet(s) to the corresponding application.

The user plane protocol stacks of the UE and the HeNB+ are respectively described in such as the exemplary embodiments of FIG. 12B and FIG. 12C, and FIG. 13B and FIG. 13C, and are not repeated here. The HeNB+ data paths are respectively described in such as the exemplary embodiments of FIG. 13B and FIG. 13C, and are not repeated here.

In summary, the exemplary embodiments of the disclosure provide an apparatus and method of bandwidth aggregation for radio accessing on multi-networks to allow the packets of a same bearer between a UE on a first network and a network device supporting the first network and a second network to be transmitted by simultaneously using the first and the second networks. The technique may divide a same IP flow between the UE and the network device into two flows, allow these flows takes different radio paths, and then integrates these flows into a flow at both ends of the radio paths; and reverse versa. When the first and the second networks operate simultaneously, the second network interface of the UE may detect more than one second network APs. Therefore, the exemplary embodiments disclose feasible schemes for the UE to identify the second network AP(s) associated with the network device. When more than one UEs attempt to use the second network interface of the network device, the exemplary embodiments disclose feasible schemes for the network device to identify the second network ID of the UE. When the UE has established the first network connection, and simultaneously uses the second network to transmit and receive packet(s), the exemplary embodiments disclose feasible schemes for the network device to identify a second network packet belongs to which connection.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method of bandwidth aggregation for radio accessing on multi-networks, comprising:
through a first network, exchanging or setting, between a user equipment (UE) on the first network and a network device supporting both the first network and a second network, a second network information of each other,
wherein said UE and said network device use said first network to exchange said second network information of each other, said network device sets a Service Set Identifier (SSID) to a global cell Identifier (ID) or a Closed Subscriber Group ID (CSG ID), and adds said global cell ID or said CSG ID in a system information broadcast, or
a mobility management element of a core network adds a service set identifier of the network device in a non-access stratum message and further transmits to said UE through said first network.

2. The method as claimed in claim 1, wherein said first network is a wireless network having a connection management and its radio access is achieved by a non-contention-based media access control (MAC) technology, while said second network is a wireless network not having a connection management and its radio access is achieved by a contention-based MAC technology.

3. The method as claimed in claim 1, wherein said first network is a Third Generation Partnership Project wireless network or a worldwide interoperability microwave access wireless network.

4. The method as claimed in claim 1, wherein said second network is a Wireless Fidelity network.

5. A method of bandwidth aggregation for radio accessing on multi-networks, comprising:
through a first network, exchanging or setting, between a user equipment (UE) on the first network and a network device supporting both the first network and a second network, a second network information of each other,
wherein said UE and said network device use said first network to exchange said second network information of each other, and said UE adds said second network information in a radio resource control (RRC) message, or
wherein said UE and said network device use said first network to exchange said second network information of each other, said UE adds its second network information in a non-access stratum (NAS) message of said first network and transmits said second network information to a mobile management element of a core network, and said mobile management element further transmits to said network device, or
a management unit of a core network transmits said second network information of said UE to said network device and the second network information is predefined, and said management unit is one of a mobile management element or a device management unit.

6. The method as claimed in claim 5, wherein said first network is a wireless network having a connection management and its radio access is achieved by a non-contention-based media access control (MAC) technology, while said second network is a wireless network not having a connection management and its radio access is achieved by a contention-based MAC technology.

7. The method as claimed in claim 5, wherein said first network is a Third Generation Partnership Project wireless network or a worldwide interoperability microwave access wireless network.

8. The method as claimed in claim 5, wherein said second network is a Wireless Fidelity network.

9. A method of bandwidth aggregation for radio accessing on multi-networks, comprising:
by providing a user equipment (UE) and a first network, the first network comprising a controller, a first network module and a second network module;
connecting the UE to a network device supporting both the first network and a second network; and
according to an information of the at least one first network dedicated bearer between the UE on the first network and the network device supporting both the first network and a second network, transmitting one or more data packets belonging to the at least one first network dedicated bearer by using both the first and the second networks,
wherein the UE connects a first connection to the first network and a second connection to the second network according to either a Media Access Control (MAC) header or an Internet Protocol (IP) header.

10. The method as claimed in claim 9, wherein said first network is a wireless network having a connection management and its radio access is achieved by a non-contention-based media access control (MAC) technology, while said second network is a wireless network not having a connection management and its radio access is achieved by a contention-based MAC technology.

11. The method as claimed in claim 9, wherein said first network is a Third Generation Partnership Project wireless network or a worldwide interoperability microwave access wireless network.

12. The method as claimed in claim 9, wherein said second network is a Wireless Fidelity network.

13. The method as claimed in claim 9, wherein said method further includes:
transmitting, by said UE, said one or more data packets which belong to said at least one first network dedicated bearer by using said second network, wherein said UE uses one or more options of an IP option field in an Internet Protocol (IP) header to regulate an enhanced radio accessing bearer identifier (eRAB ID) information, and said network device uses said eRAB ID information of said IP header to identify a corresponding first network dedicated bearer of said at least one first network dedicated bearer.

14. The method as claimed in claim 9, wherein said method further includes:
transmitting, by said UE, said one or more data packets which belong to said at least one first network dedicated bearer by using said second network, wherein said UE uses a field in a MAC header of said second network to regulate an enhanced radio accessing bearer identifier (eRAB ID) information, and said network device uses said eRAB ID information of said MAC header to identify a corresponding first network dedicated bearer of said at least one first network dedicated bearer.

15. The method as claimed in claim 9, wherein when said UE establishes said at least one first network dedicated bearer, said network device specifies a corresponding private MAC address to each of said at least one first network dedicated bearer.

16. The method as claimed in claim 15, wherein said UE uses said second network to transmit said one or more data packets belonging to said at least one first network dedicated bearer, fills said corresponding private MAC address of each of said at least one first network dedicated bearer to a field in the MAC header of said second network, and said network devices uses said corresponding private MAC address in said MAC header to identify a corresponding first network dedicated bearer of said at least one first network dedicated bearer.

17. The method as claimed in claim 9, wherein when said network device uses said second network to transmit said one or more data packets belonging to said at least one first network dedicated bearer, a second network MAC address of said UE is placed in a field in said MAC header of said second network to identify said one or more data packets by said UE.

18. An apparatus of bandwidth aggregation for radio accessing on multi-networks, configured in a user equipment (UE) on a first network, said apparatus comprising:
a first network module configured to exchange a first information with a first network element of a network device;
a second network module configured to exchange a second information with a second network element of said network device; and
a controller configured to exchange between the UE and a network device supporting both the first network and a second network, a second network related information of each other through the first network,
the controller being further configured either:
to retrieve a global cell Identifier (ID) or a Closed Subscriber Group ID (CSG ID) in received system information broadcast and interpret the retrieved ID as the service set identifier (SSID) of the network device, or
to retrieve the service set identifier of the network device which is added by a mobility management element of a core network in a non-access stratum message,
the controller being yet further configured to establish at least one first network dedicated bearer, and according to an information of the at least one first network dedicated bearer, transmit/receive one or more data packets by using the first and the second networks.

19. The apparatus as claimed in claim 18, wherein said first network is a wireless network having a connection management and its radio access is achieved by a non-contention-based media access control (MAC) technology, while said second network is a wireless network not having a connection management and its radio access is achieved by a contention-based MAC technology.

20. The apparatus as claimed in claim 18, wherein said UE receives an identifier (ID) of said second network associated with said network device through said first network and further transmits to said controller, and said controller lets said second network connect to said ID of said second network associated with said network device through at least one related parameter set by the second network module.

21. The apparatus as claimed in claim 18, wherein said controller obtains a second network information of said UE from said second network module, places said second network information of said UE in a field of a radio resource control message, and transmit to said network device by using said first network module.

22. The apparatus as claimed in claim 21, wherein after said network device receives said second network information in said radio resource control (RRC) message, said network device accepts a connection request transmitted in the second network from said UE.

23. The apparatus as claimed in claim 18, wherein said controller obtains a second network information of said UE from said second network module, and places said second network information of said UE in a field of a non-access stratum (NAS) message, and uses said first network module to transmit to a core network node through said network device.

24. The apparatus as claimed in claim 23, wherein when said core network node receives said second network information in said NAS message, said core network node uses a protocol with said network device to forward to said network device, and after said network device receives the second network information, the network device accepts a connection request transmitted in the second network from said UE.

25. The apparatus as claimed in claim 18, wherein when said UE transmits an uplink data packet, said controller modifies an IP header, places an enhanced radio accessing bearer (eRAB) information in said IP header, and uses said second network module to transmit to said network device.

26. The apparatus as claimed in claim 25, wherein when said network device receives said data packet, said network device identifies said eRAB information in said IP header, and finds a corresponding tunnel to transmit said data packet.

27. The apparatus as claimed in claim 18, wherein when a dedicated connection is established by said UE and said network device, said network device configures a private media access control (MAC) address to said dedicated connection.

28. The apparatus as claimed in claim 27, wherein when said UE transmits an uplink data packet, said controller informs said second network module to add said private MAC address in a MAC header, and further transmits to said network device by using said second network module.

29. The apparatus as claimed in claim 28, wherein when said network device receives said uplink data packet, said network device identifies said private MAC address in said MAC header, finds a corresponding tunnel, and transmits said data packet through said corresponding tunnel.

30. The apparatus as claimed in claim 18, wherein when said UE transmits a uplink data packet, said controller informs said second network module to add an enhanced radio accessing bearer (eRAB) information in a medium access control (MAC) header, and uses said second network module to transmit said uplink data packet to said network device.

31. The apparatus as claimed in claim 30, wherein when said network device receives said uplink data packet, identifies said eRAB information in said MAC header, and finds a corresponding tunnel to transmit said data packet.

32. An apparatus of bandwidth aggregation for radio accessing on multi-networks, configured in a network device supporting both the first network and a second network, said apparatus comprising:
    a first network element configured to exchange a first information with a first network module of a user equipment (UE), and exchange an information with a core network node;
    a second network element configured to exchange a second information with a second network module of said UE; and
    a controller configured to exchange between said UE and said network device, a second network related information of each other through said first network in which the second network information is:
    included in a radio resource control (RRC) message which is transmitted to the network device, or
    included in a non-access stratum (NAS) message of said first network which is transmitted to a mobile management element in a core network, the mobile management element being configured to transmit the second network related information to the network device, or
    stored in a database which is accessible by a mobile management element in a core network, the mobile management element being configured to transmit the second network related information to the network device,
    the controller being further configured to establish at least one first network dedicated bearer, and according to information of said at least one first network dedicated bearer, transmit/receive one or more data packets by using the first and the second networks.

33. The apparatus as claimed in claim 32, wherein said first network is a wireless network having a connection management and its radio access is achieved by a non-contention-based media access control (MAC) technology, while said second network is a wireless network not having a connection management and its radio access is achieved by a contention-based MAC technology.

34. The apparatus as claimed in claim 32, wherein said controller obtains said second network information of said UE through said first network, and controls said second network module whether to accept a connection request of said UE based on said second network information of said UE.

35. The apparatus as claimed in claim 32, wherein said controller sets a service set identifier (SSID) of said second network element as a global cell identifier (ID) or a closed subscriber group ID of said first network module, and broadcasts said global cell ID or said closed subscriber group ID to said UE through a system information broadcast (SIB).

36. The apparatus as claimed in claim 35, wherein when the UE receives said global cell ID or said closed subscriber group ID of said SIB, said UE requests said second network module to connect an access point fitting said SSID.

37. The apparatus as claimed in claim 32, wherein a node of said core network places a service set identifier (SSID) of said second network module in a field of a non-access stratum (NAS) message, and transmit to the UE by using said first network module.

38. The apparatus as claimed in claim 37, wherein when said UE receives said SSID in said NAS message, the UE requests said second network to connect an access point fitting said SSID.

39. The apparatus as claimed in claim 32, wherein when said network device transmits a downlink data packet, said controller informs said second network module of a second network media access control address of said UE and transmits to said UE by using said second network module.

40. The apparatus as claimed in claim 32, wherein when said UE and said network device establish a dedicated bearer, said network device configures a private media access control address to said dedicated bearer.

41. An apparatus of bandwidth aggregation for radio accessing on multi-networks, configured in a user equipment (UE) on a first network, said apparatus comprising:
    a first network module configured to exchange a first information with a first network element of a network device;
    a second network module configured to exchange a second information with a second network element of said network device; and
    a controller configured to exchange between the UE and a network device supporting both the first network and a second network, a second network related information of each other through the first network, in which the second network information is:
    included in a radio resource control (RRC) message which is transmitted to the network device, or
    included in a non-access stratum (NAS) message of said first network which is transmitted to a mobile management element in a core network, the mobile management element being configured to transmit the second network related information to the network device, or;
    stored in a database which is accessible by a mobile management element in a core network, the mobile management element being configured to transmit the second network related information to the network device,
    the controller being further configured to establish at least one first network dedicated bearer, and according to an information of the at least one first network dedicated bearer, transmit/receive one or more data packets by using the first and the second networks.

42. The apparatus as claimed in claim 41, wherein said first network is a wireless network having a connection management and its radio access is achieved by a non-contention-based media access control (MAC) technology, while said second network is a wireless network not having a connection management and its radio access is achieved by a contention-based MAC technology.

43. The apparatus as claimed in claim 41, wherein said UE receives an identifier (ID) of said second network associated with said network device through said first network and further transmits to said controller, and said controller lets said second network connect to said ID of said second network associated with said network device through at least one related parameter set by the second network module.

44. The apparatus as claimed in claim 41, wherein said controller obtains a second network information of said UE from said second network module, places said second network information of said UE in a field of a radio resource control message, and transmit to said network device by using said first network module.

45. The apparatus as claimed in claim 44, wherein after said network device receives said second network information in said RRC message, said network device accepts a connection request transmitted in the second network from said UE.

46. The apparatus as claimed in claim 41, wherein said controller obtains a second network information of said UE from said second network module, and places said second network information of said UE in a field of a non-access stratum (NAS) message, and uses said first network module to transmit to a core network node through said network device.

47. The apparatus as claimed in claim 46, wherein when said core network node receives said second network information in said NAS message, said core network node uses a protocol with said network device to forward to said network device, and after said network device receives the second network information, the network device accepts a connection request transmitted in the second network from said UE.

48. The apparatus as claimed in claim 41, wherein when said UE transmits an uplink data packet, said controller modifies an IP header, places an enhanced radio accessing bearer (eRAB) information in said IP header, and uses said second network module to transmit to said network device.

49. The apparatus as claimed in claim 48, wherein when said network device receives said data packet, said network device identifies said eRAB information in said IP header, and finds a corresponding tunnel to transmit said data packet.

50. The apparatus as claimed in claim 41, wherein when a dedicated connection is established by said UE and said network device, said network device configures a private media access control (MAC) address to said dedicated connection.

51. The apparatus as claimed in claim 50, wherein when said UE transmits an uplink data packet, said controller informs said second network module to add said private MAC address in a MAC header, and further transmits to said network device by using said second network module.

52. The apparatus as claimed in claim 51, wherein when said network device receives said uplink data packet, said network device identifies said private MAC address in said MAC header, finds a corresponding tunnel, and transmits said data packet through said corresponding tunnel.

53. The apparatus as claimed in claim 41, wherein when said UE transmits a uplink data packet, said controller informs said second network module to add an enhanced radio accessing bearer (eRAB) information in a medium access control (MAC) header, and uses said second network module to transmit said uplink data packet to said network device.

54. The apparatus as claimed in claim 53, wherein when said network device receives said uplink data packet, identifies said eRAB information in said MAC header, and finds a corresponding tunnel to transmit said data packet.

\* \* \* \* \*